United States Patent
Albou et al.

(10) Patent No.: US 10,173,577 B2
(45) Date of Patent: Jan. 8, 2019

(54) PROJECTION METHOD FOR A MOTOR VEHICLE, FOR PROJECTING AN IMAGE ON TO A PROJECTION SURFACE

(71) Applicant: VALEO VISION, Bobigny (FR)

(72) Inventors: Pierre Albou, Bobigny (FR); Xavier Morel, Bobigny (FR); Hafid El Idrissi, Bobigny (FR); Stephan Sommerschuh, Paris (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/759,636

(22) PCT Filed: Sep. 13, 2016

(86) PCT No.: PCT/EP2016/071596
§ 371 (c)(1),
(2) Date: Mar. 13, 2018

(87) PCT Pub. No.: WO2017/046105
PCT Pub. Date: Mar. 23, 2017

(65) Prior Publication Data
US 2018/0251064 A1 Sep. 6, 2018

(30) Foreign Application Priority Data

Sep. 14, 2015 (FR) ...................................... 15 58592

(51) Int. Cl.
*B60Q 1/02* (2006.01)
(52) U.S. Cl.
CPC ............ *B60Q 1/02* (2013.01); *B60Q 2400/50* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,462,769 B1 * | 10/2002 | Trowbridge | ............ | A63G 31/16 |
| | | | | 348/51 |
| 7,791,458 B2 * | 9/2010 | Shimaoka | .............. | B60Q 1/085 |
| | | | | 340/435 |
| 9,785,042 B2 * | 10/2017 | Fujita | ........................ | B60Q 1/50 |

(Continued)

FOREIGN PATENT DOCUMENTS

| | | |
|---|---|---|
| FR | 2 919 934 A1 | 2/2009 |
| WO | WO 00/35200 A1 | 6/2000 |
| WO | WO 02/093483 A1 | 11/2002 |

OTHER PUBLICATIONS

International Search Report dated Nov. 17, 2016 in PCT/EP2016/071596 filed Sep. 13, 2016.

*Primary Examiner* — Travis R Hunnings
(74) *Attorney, Agent, or Firm* — Oblon, McClelland, Maier & Neustadt, L.L.P.

(57) ABSTRACT

A projection method for a motor vehicle, for projecting at least one image onto a projection surface by means of a light module suitable for projecting a light beam, wherein the projection method includes the steps of detecting an observation position of an observer in a light module reference frame, calculating the observation position of the observer in an image reference frame, and projecting the image onto the projection surface according to the observation position of the observer in the image reference frame, the image being integrated into the light beam of the light module.

28 Claims, 8 Drawing Sheets

(56) References Cited

U.S. PATENT DOCUMENTS

| | | | |
|---|---|---|---|
| 9,862,311 B2* | 1/2018 | Kiriyama | B60Q 1/0023 |
| 9,978,280 B2* | 5/2018 | Lee | G08G 1/166 |
| 9,987,979 B2* | 6/2018 | Kawamata | B60Q 1/50 |
| 2002/0180733 A1 | 12/2002 | Colmenarez et al. | |
| 2011/0211175 A1 | 9/2011 | Stehle et al. | |
| 2012/0044090 A1* | 2/2012 | Kahler | B60Q 1/50 340/905 |
| 2012/0075875 A1* | 3/2012 | Son | B60Q 1/50 362/487 |
| 2013/0154815 A1* | 6/2013 | Min | B60Q 1/085 340/425.5 |
| 2014/0028980 A1* | 1/2014 | Othmer | B60Q 1/50 353/14 |
| 2014/0049384 A1* | 2/2014 | Mueller | B60Q 9/008 340/435 |
| 2015/0158428 A1* | 6/2015 | Beggs | B60Q 1/2673 340/436 |
| 2015/0203023 A1* | 7/2015 | Marti | B60O 1/00 340/425.5 |
| 2016/0207443 A1* | 7/2016 | Widdowson | B60Q 1/0011 |

* cited by examiner

PROJECTION METHOD FOR A MOTOR VEHICLE, FOR PROJECTING AN IMAGE ON TO A PROJECTION SURFACE

TECHNICAL FIELD OF THE INVENTION

The present invention relates to a projection method for a motor vehicle, for projecting at least one image onto a projection surface by means of a light module.

It finds a particular but not restrictive application in lighting devices, such as motor vehicle headlights.

TECHNOLOGICAL BACKGROUND OF THE INVENTION

A projection method for a motor vehicle, for projecting at least one image known to the person skilled in the art includes projecting onto a projection surface, such as the highway, a graphic symbol comprehensible to the driver of the motor vehicle in order to assist them in driving the vehicle. For example, the graphic symbol may be the highway speed limit not to be exceeded, or the distance at which there is another motor vehicle.

One drawback of this prior art is that this method applies only to the driver.

In this context, the present invention aims at providing a projection method for a motor vehicle, for projecting at least one image onto a projection surface by means of a light module which applies regardless of the observation position of the observer with respect to the motor vehicle and which thus makes it possible to obtain an image that is comprehensible to an observer outside the vehicle or which is comprehensible to an observer located inside the motor vehicle.

GENERAL DESCRIPTION OF THE INVENTION

To this end the invention provides a projection method for a motor vehicle, for projecting at least one image onto a projection surface by means of a light module suitable for projecting a light beam, in which said projection method includes the steps of:
  detecting an observation position of an observer in a light module reference frame;
  calculating the observation position of the observer in an image reference frame;
  projecting said image onto said projection surface according to said observation position of the observer in said image reference frame, said image being integrated into said light beam of the light module.

Thus, as will be seen in detail below, the projection of the image to be projected is dependent on the observation position of an observer and is introduced into the light beam of the light module. In this way, the image is thus made visible and comprehensible to said observer, whether they are located inside the passenger compartment of the motor vehicle or outside the motor vehicle.

According to some non-restrictive embodiments, the projection method may further comprise one or more of the following additional features:

According to one non-restrictive embodiment, the projection of said image comprises the substeps of:
  from a light intensity map of the light beam of the light module including a plurality of intensity indicators, calculating a luminance mapping on the projection surface resulting in luminance points;
  calculating the position of each luminance point in the image reference frame;
  from its position and the observation position of the observer in said image reference frame, defining the coordinates of the projection of each luminance point on the image plane of said image to be projected;
  if said projection belongs to said image to be projected, defining coordinates of the corresponding pixel;
  for each projection of a luminance point belonging to said image to be projected, correcting the intensity value of the corresponding intensity indicator according to the color of the corresponding pixel.

According to one non-restrictive embodiment, calculating the luminance mapping on the projection surface includes the steps of:
  performing a first calculation of the position of said intensity indicators on the projection surface resulting in impact points;
  performing a second calculation of an illumination mapping of said impact points;
  performing a third calculation of the luminance mapping of said impact points from the illumination mapping resulting in said luminance points.

According to one non-restrictive embodiment, said first calculation is based on:
  the position of the light module; and
  the direction of said intensity indicators.

According to one non-restrictive embodiment, said second calculation is based on:
  the calculated position of the intensity indicators;
  the light intensity of said intensity indicators; and
  the distance between the light module and said impact points.

According to one non-restrictive embodiment, the image to be projected is calculated according to the properties of the projection surface.

According to one non-restrictive embodiment, said third calculation is based on:
  the illumination of said impact points;
  a position vector between the position of an impact point of the illumination mapping and the observation position of the observer; and
  a light diffusion function.

According to one non-restrictive embodiment, calculating the observation position of an observer and the position of a luminance point in the image reference frame is based on at least one transformation matrix for transforming from the light module reference frame to said image reference frame which takes into account at least one of the following parameters:
  the position of the image to be projected in the light module reference frame;
  the rotation of the image to be projected.

According to one non-restrictive embodiment, the definition of the coordinates of a projection of a luminance point includes the substeps of:
  calculating the intersection point between:
    the straight line passing through the observation position in said image reference frame of the observer and through the position in said image reference frame of said luminance point; and
    the image plane of the image to be projected;
  determining the coordinates of said intersection point from dimensions of said image to be projected.

According to one non-restrictive embodiment, the projection surface is considered as a Lambertian diffuser.

According to one non-restrictive embodiment, the projection surface is a ground or a wall.

According to one non-restrictive embodiment, the observer is outside the motor vehicle or is located in said motor vehicle.

According to one non-restrictive embodiment, the image appears distorted in the light module reference frame and not distorted in the image reference frame.

According to one non-restrictive embodiment, calculating the observation position of the observer in the image reference frame is a function of the position and the rotation of the image to be projected in the light module reference frame, said rotation being a function of an elevation angle greater than −90° and less than or equal to 0°.

According to one non-restrictive embodiment, calculating the position of each luminance point in the image reference frame is a function of the position and the rotation of the image to be projected in the light module reference frame, said rotation being a function of an elevation angle greater than −90° and less than or equal to 0°.

According to one non-restrictive embodiment, the elevation angle is equal to 0.

According to one non-restrictive embodiment, the elevation angle is substantially equal to minus 35°.

According to one non-restrictive embodiment, the projection of each luminance point onto the image plane of said image to be projected is central, so as to produce a conical perspective effect.

According to one non-restrictive embodiment, correcting the intensity value of the intensity indicator is performed as follows:

$Vi = \sigma \cdot Vi0 * Co/255$, with $Vi$ the corrected intensity value, $Vi0$ the initial intensity value of the intensity indicator of the light module, $Co$ the color of the corresponding pixel, $\sigma$ a maximum overdrive factor.

According to one non-restrictive embodiment, correcting the intensity value of the intensity indicator is performed as follows:

$Vi = \varphi \cdot Co$, with $Vi$ the corrected intensity value, $\varphi$ a luminance coefficient, $Co$ the color of the corresponding pixel.

According to one non-restrictive embodiment, the observation position of an observer is calculated by means of a camera.

According to one non-restrictive embodiment, the light intensity map is stored in a memory.

According to one non-restrictive embodiment, the projection of said image onto the projection surface further comprises the substep of projecting by means of said light module onto the projection surface, the light beam with the corrected intensity values of the intensity indicators.

A lighting device is also provided for a motor vehicle including a processing unit and a light module suitable for projecting a light beam, in which:

said processing unit is suitable for:
  detecting an observation position of an observer in a light module reference frame;
  calculating the observation position of the observer in an image reference frame;
said lighting device is suitable for projecting said image onto said projection surface according to said observation position of the observer in the image reference frame, said image being integrated into said light beam of the light module.

According to one non-restrictive embodiment, for projecting said image onto the projection surface, said processing unit is further suitable for:

from a light intensity map of the light beam of the light module including a plurality of intensity indicators, calculating a luminance mapping on the projection surface resulting in luminance points;
calculating the position of each luminance point in the image reference frame;
from its position and the observation position of the observer in said image reference frame, defining the coordinates of the projection of each luminance point on the image plane of said image to be projected;
if said projection belongs to said image to be projected, defining coordinates of the corresponding pixel;
for each projection of a luminance point belonging to said image to be projected, correcting the intensity value of the corresponding intensity indicator according to the color of the corresponding pixel.

According to one non-restrictive embodiment, for projecting said image onto the projection surface the light module is suitable for projecting onto the projection surface, the light beam with the corrected intensity values of the intensity indicators.

According to one non-restrictive embodiment, the lighting device is a headlight or a rear light.

According to one non-restrictive embodiment, the processing unit is integrated into the light module.

A motor vehicle is also provided including a lighting device according to the preceding features.

BRIEF DESCRIPTION OF THE FIGURES

The invention and its various applications will be better understood on reading the following description and examining its accompanying figures.

DESCRIPTION OF EMBODIMENTS OF THE INVENTION

Identical elements, by structure or by function, appearing in different figures, unless specified otherwise, keep the same references.

The projection method MTH for a motor vehicle, for projecting at least one image onto a projection surface by means of a light module ML according to the invention is described with reference to FIGS. 1 through 16.

Motor vehicle is understood to mean any type of motorized vehicle.

Figure 1:
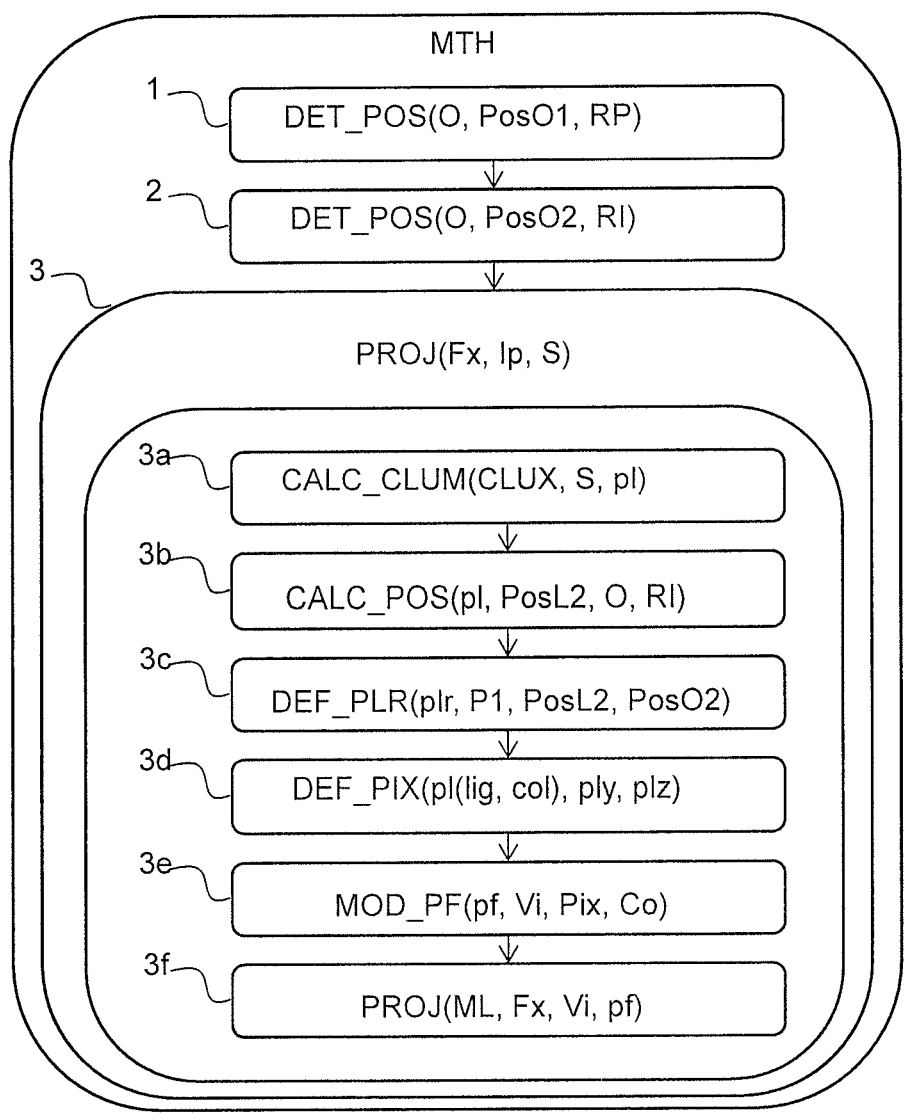
FIG. 1 represents a flow diagram of the steps of the projection method for projecting at least one image onto a projection surface according to a non-restrictive embodiment of the invention.

As illustrated in FIG. 1, the method MTH includes the steps of:
- detecting an observation position PosO1 of an observer O in a light module reference frame RP (illustrated step DET_POS(O, PosO1, RP));
- calculating the observation position PosO2 of the observer O in an image reference frame RI (illustrated step DET_POS(O, PosO2, RI));
- projecting said image Ip onto said projection surface S according to said observation position PosO2 of the observer O in said image reference frame RI, said image Ip being integrated into said light beam Fx of the light module ML (illustrated step PROJ(Fx, Ip, S)).

As illustrated in FIG. 1, the projection of said image comprises the substeps of:
3a), from a light intensity map CLUX of the light module ML including a plurality of intensity indicators pf, calculating a luminance mapping CLUM on the projection surface S resulting in points of luminance pl (illustrated step CALC_CLUM(CLUX, S, pl));
3b) calculating the position PosL2 of each luminance point pl in the image reference frame RI (illustrated step CALC_POS(pl, PosL2, O, RI));
3c) from its position PosL2 and the observation position PosO2 of the observer O in said image reference frame RI, defining the coordinates ply, plz of the projection plr of each luminance point pl in the image plane P1 of said image to be projected Ip (illustrated step DEF_PLR(plr, P1, PosL2, PosO2));
3d) if said projection plr belongs to said image to be projected Ip, defining coordinates lig, col of the corresponding pixel Pix (illustrated step DEF_PIX (pl(lig, col), ply, plz));
3e) for each projection plr of a luminance point pl belonging to said image to be projected Ip, correcting the intensity value Vi of the corresponding intensity indicator pf according to the color Co of the corresponding pixel Pix (illustrated step MOD_PF(pf, Vi, Pix, Co)).

It should be noted that notably the first step 3a, notably just like step 3b, may be performed prior to the iterations of the following steps. More generally, the steps described are not necessarily performed sequentially, i.e. in the same iteration loop, but may undergo different iterations, with different frequencies of iterations.

The step of projecting the image Ip further includes a substep 3f) of projecting onto the projection surface S the light beam Fx with the corrected intensity values Vi of the intensity indicators pf (illustrated step in FIG. 1 PROJ(ML, Fx, Vi, pf)).

The projection method MTH is suitable for projecting one or more images Ip at the same time. In the rest of the description, the projection of a single image is taken as a non-restrictive example.

It will be noted that the projection may take place at the front of the motor vehicle V, at the rear or on its sides.

The light module ML makes it possible to produce a light beam Fx, said light beam Fx including a plurality of light rays Rx that follow different directions. The light module ML makes it possible to modify the intensity value Vi of each intensity indicator pf, it is therefore a digitized light module. As described below, the image to be projected Ip is integrated into the light beam Fx of the light module ML.

It will be noted that the light intensity map CLUX is discretized in order to be able to be used digitally.

The light module ML is considered as a point light source from which the space around said light source is discretized. Thus, an intensity indicator pf is a point in space lit by the light module ML which has a certain direction dir1 and a given intensity value Vi provided by the light module ML in said direction dir1 The direction dir1 is given by two angles θ and δ (described later).

In one non-restrictive embodiment, the projection surface S is the ground (referenced S1) or a wall (referenced S2). The image that will be projected Ip onto the ground or the wall is thus a 2D image.

Figure 2:
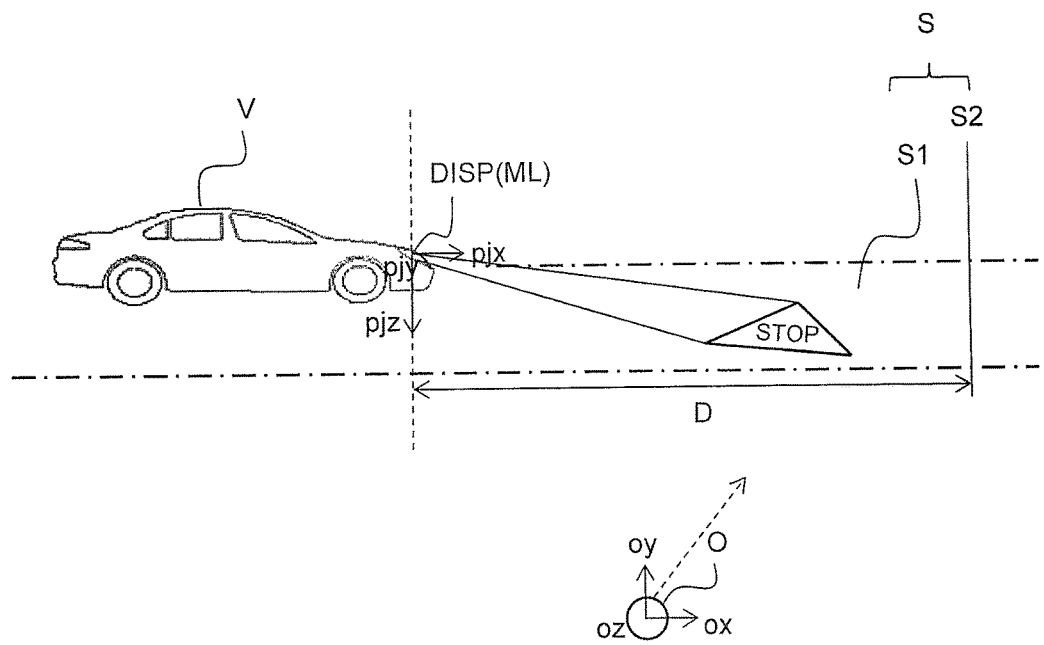
FIG. 2 represents a motor vehicle including a lighting device suitable for implementing the projection method in FIG. 1 according to a non-restrictive embodiment.

In one non-restrictive embodiment illustrated in FIG. 2, a lighting device DISP of the motor vehicle V includes at least one light module ML and is suitable for implementing the projection method MTH. In the illustrated non-restrictive example, the lighting device is a headlight.

As will be seen below, the observation position of the observer O is taken into account for projecting the image to be projected Ip. For this purpose, the image to be projected Ip will be distorted so that it is comprehensible to the observer in question, whether it is the driver or a front or rear passenger of the motor vehicle or an observer outside the motor vehicle.

Thus it is from the point of view of the observer O that the image Ip is to be projected. From the point of view of the observer, the image Ip will not be distorted. From a different point of view from said observer, the image Ip will be distorted.

In some non-restrictive embodiments, an observer O outside the vehicle is a pedestrian, a driver of another motor vehicle, a cyclist, a motorcyclist, etc. They may be at the front, at the rear or on one of the sides of the motor vehicle V.

In one non-restrictive embodiment, the projected image Ip includes at least one graphic symbol. This graphic symbol will make it possible to improve the comfort and/or safety of the observer O. In one non-restrictive example, if the observer O is the driver of the motor vehicle, the graphic symbol will be able to represent the speed limit not to be exceeded on the highway, a STOP graphic symbol when the motor vehicle backs up and an obstacle (pedestrian, wall, etc.) is located too close to the motor vehicle, an arrow that will assist them when the motor vehicle is on the point of turning on a highway, etc.

In one non-restrictive example, if the observer O is outside the motor vehicle such as a pedestrian or a cyclist, the graphic symbol may be a STOP signal for them indicate that they should not cross in front of the motor vehicle since the vehicle is about to move off again.

In one non-restrictive example, if the observer O is outside the motor vehicle such as a following motor vehicle, the graphic symbol may be a STOP signal when the motor vehicle considered brakes so that the driver of the following vehicle may brake in their turn. In another non-restrictive example, if the observer O is outside the motor vehicle and is a motor vehicle that is passing alongside, the graphic symbol may be a warning symbol to indicate to said motor vehicle to pull back in since another motor vehicle is arriving ahead.

As illustrated in FIG. 2, the projected image Ip is a STOP symbol. It is directed onto the projection surface S, here the ground in the illustrated non-restrictive example, in such a way that the observer O may see and comprehend this STOP symbol. In the illustrated non-restrictive example, the projection takes place in front of the motor vehicle V and the observer O is outside the motor vehicle V.

The various steps in the projection method MTH are described in detail below.

1) Detecting the observation position of the observer in the light module reference frame RP For detecting the observation position PosO1 of the observer O in the light module reference frame RP, it is necessary to detect the position of the actual observer O in the light module reference frame RP. For this purpose, in one non-restrictive example, a camera (not illustrated) is used. It is suitable for detecting and calculating the position of an observer O located outside the motor vehicle V.

In some non-restrictive embodiments, the camera is replaced by radar, or lidar.

For an observer O who is located inside the motor vehicle (driver or passengers), reference observation positions are considered, for example. Thus, in one non-restrictive example, it is considered that the eye of the driver is located at the position PosO1 (1.5;−0.5; 1) (expressed in meters) from the light module ML in the case of a motor vehicle that is an automobile. Of course, if the motor vehicle is a truck, the position of the eye with respect to the light module ML is different.

For an outside observer, from the position of said observer O, their observation position PosO1 may be deduced corresponding to the position of their eye. For example, the position of their eye is situated approximately 1.5 meters from the ground.

Since such detection of the position of the observer is well known to the person skilled in the art, it is not described in detail here.

2) Calculating the observation position of the observer in the image reference frame RI The observation position PosO1 of the observer O has been previously determined according to the light module reference frame RP. It will be used for the change of coordinate system described below.

This step performs a change of coordinate system. Indeed the light module reference frame RP (defined by the axes pjx, pjy, pjz) changes to the image reference frame RI (defined by the axes lx, ly, lz) of the image to be projected Ip.

Calculating the observation position PosO2 of the observer O in the image reference frame RI is based on at least one transformation matrix M for transforming from the light module reference frame RP to said image reference frame RI.

In one non-restrictive embodiment, the position PosO2 is of the form:

$$\begin{bmatrix} pjx \\ pjy \\ pjz \\ 1 \end{bmatrix}$$

In one non-restrictive embodiment, said at least one transformation matrix M takes into account at least one of the following parameters:
  the position PosIp of the image to be projected Ip in the light module reference frame RP;
  the rotation RotIp of the image to be projected Ip in the light module reference frame RP;
  the scale of the image to be projected Ip.

The position PosIp of the image to be projected Ip is deduced from the light module reference frame RP according to a translation along the three axes pjx, pjy, pjz of said light module reference frame RP.

In one non-restrictive embodiment, the transformation matrix M is of the form:

$$\begin{bmatrix} a & b & c & t \\ d & e & f & u \\ g & h & i & v \\ 0 & 0 & 0 & 1 \end{bmatrix}$$

Where a, e and i are the affinity terms; b, c, d, f, g and h the rotation terms; and t, u and v the translation terms.

The affinity terms a, e and i make it possible to achieve an expansion or a contraction of the image Ip, e.g. the overall size (homothety) is increased by 50% or is reduced by 20%, by increasing by 50%, respectively by reducing by 20%, the values of a, e and i. By way of example a value of a, e and i equal to 1 corresponds to a reference dimension of the projected image, respectively in the directions pjx, pjy and pjz. It is also possible to apply the expansion or contraction factors in only one of the dimensions, or two of the dimensions (non-homothetic). It is also possible to apply different expansion or contraction factors to some dimensions compared with others, in particular it is possible to apply different expansion or contraction factors to each dimension. In this way, according to the position PosO2 of the eye of the observer O, it may be decided to project an image that appears to the observer O more or less large overall or along some of the dimensions, according to whether the values of a, e and i increase or decrease respectively.

It will be noted that the rotation RotIp depends on three angles which are as follows:

β: azimuth (indicating whether the image to be projected is located to the right or to the left of the observer, e.g. when the latter looks left or right);

Ω: tilt (which indicates the inclination of the image to be projected Ip, e.g. when the observer leans their head to the side. This amounts to tilting the image Ip);

ε: elevation (which indicates the effect that it is wished to give the graphic symbol of the image Ip).

Figure 8:
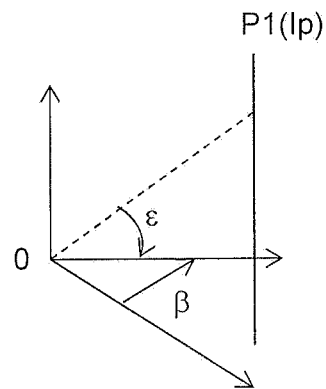
FIG. 8 indicates the elevation angle and the azimuth angle taken into account in a step of calculating the observation position of an observer in the projection method in FIG. 1.

FIG. 8 shows the elevation and azimuth angles, and the plane P1 of the image to be projected Ip.

Thus PosO2=M*PosO1.

PosO1 is the observation position of the observer O used for projecting the image Ip in the light module reference frame RP.

PosO2 is the observation position of the observer O used for projecting the image Ip in the image reference frame RI.

Thus, the position and the rotation of the image to be projected Ip are appropriate to the observer O. In this way, the image to be projected Ip will be comprehensible to the observer O. Thus an affine distortion of the image is obtained from the desired point of view, called anamorphosis.

Thus, to an automobile driver's eye, the projected image Ip is not distorted. In the same way, to a truck driver's eye, although they are positioned well above the light module reference frame RP, the projected image Ip is still not distorted. Finally, for an outside observer, the projected image Ip is also not distorted.

It will be noted that the projected image Ip may thus be clearly visible to the observer since its projection depends on the observation position of the observer O and its scale can be modulated as wished. Thus, even if they are far from the motor vehicle, the observer O will still be able to comprehend and see the graphic symbol(s) of the projected image Ip.

3) Projecting the image Ip onto the projection surface

This step includes the following substeps:

3a.) Calculating a luminance mapping CLUM

In one non-restrictive embodiment, the light intensity map CLUX is stored in a memory. It will have been previously prepared during the design of the product, by means of a goniophotometer (not illustrated). The goniophotometer is, for example, of type A, i.e. the rotational movement about the horizontal axis supports the rotational movement about the vertical axis adjusted for the rotation about the horizontal axis. The light intensity map CLUX gives the intensity indicators pf of the light module ML considered as a point light source. The direction dir1 of a light ray Rx starting from the light module ML is expressed as a function of two angles θ and δ and is given by the following formula:

$$\text{direction} = \begin{pmatrix} \cos\theta * \cos\delta \\ \sin\theta \\ \cos\theta * \sin\delta \end{pmatrix}$$

With δ the vertical rotation V of the goniophotometer; and θ the horizontal rotation H of the goniophotometer.

Figure 3:
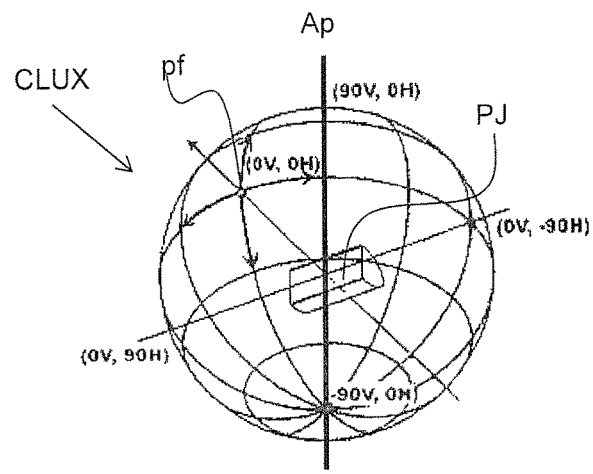
FIG. 3 represents a light intensity map prepared according to a step in the projection method in FIG. 1 according to a non-restrictive embodiment.

The light intensity map CLUX thus includes a plurality of intensity indicators pf, the direction dir1 of which is given by the formula above, with θ the horizontal angle of the intensity indicator pf, and δ the vertical angle of the intensity indicator pf. The light intensity map CLUX is represented in FIG. 3. It can be seen that there is an intensity indicator pf of polar coordinates δ=0V, θ=0H. The light intensity map CLUX thus makes it possible to determine an intensity I(θ,δ) for a given direction.

Thus:

$CLUX=\{(\delta_i, \theta_j, I_{i,j}), (i, j) \in [1,M] \times [1,N]\}$, where M and N are the numbers of discretization points (or intensity indicators) of the light beam Fx along the (respectively) vertical and horizontal directions.

An intensity indicator pf is therefore defined by its direction dir1 and its intensity I(θ,δ).

Figure 4:
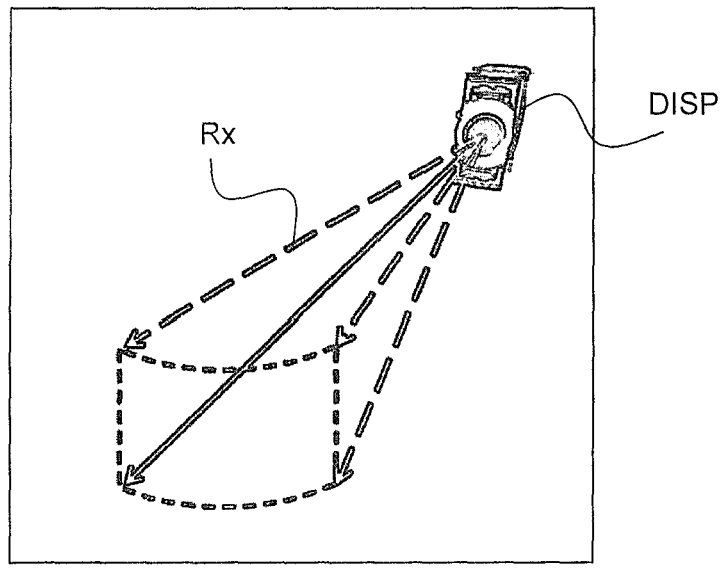
FIG. 4 represents a headlight which incorporates a light module and the direction of a light ray from a light module of said headlight, said light module being suitable for performing at least one step in the projection method in FIG. 1.

FIG. 4 illustrates a lighting device DISP including a light module ML with the direction of a light ray Fx.

Figure 5:
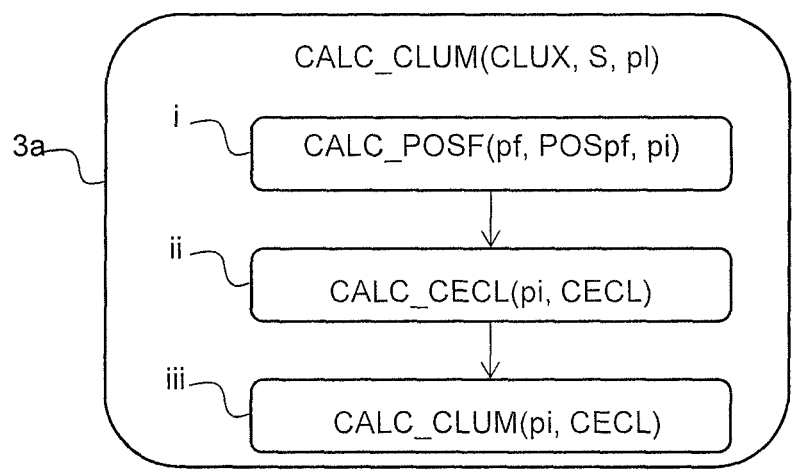
FIG. 5 represents a flow diagram illustrating substeps of a step of preparing a luminance map in the projection method in FIG. 1 according to a non-restrictive embodiment.

Calculating the luminance mapping CLUM on the projection surface S includes the following substeps illustrated in FIG. 5.

i) a first calculation of the position POSpf of said intensity indicators pf on the projection surface S resulting in impact points pi (illustrated step CALC_POSF(pf, POSpf, pi));

ii) a second calculation of an illumination mapping CECL of said impact points pi (illustrated step CALC_CECL (pi, CECL));

iii) a third calculation of the luminance mapping CLUM of said impact points pi from the illumination mapping CECL resulting in said luminance points pl (illustrated step CALC_CLUM(pi, CECL)).

The various substeps are given in detail below.

It will be noted that the calculations below are performed according to the projection surface S (ground S1 or wall S2).

substep i)

The first calculation is based on:

the position POSpj of the light module ML in the x, y, z Cartesian coordinate system; and the direction dir1 of said intensity indicators pf previously described.

For the ground S1, the position POSpf1 is obtained of the intensity indicator pf on the ground in the x, y, z Cartesian coordinate system with the following formula.

$POSpf1=POSpj-(POSpj.z/dir1.z)*dir1$

With POSpj.z, the z value of the position of the light module ML (height of the light module above the ground) and dir1.z, the z value of the direction vector of the light ray Rx.

For the wall S2, the position POSpf2 is obtained of the intensity indicator pf on the wall in the Cartesian x, y, z coordinate system with the following formula.

$POSpf2=POSpj-(D/dir1.x)*dir1$

With dir1.x, the x value of the direction vector of the light ray Rx;

D, the distance between the light module ML and the wall.

In one non-restrictive example, D is equal to 25 meters.

Figure 6:
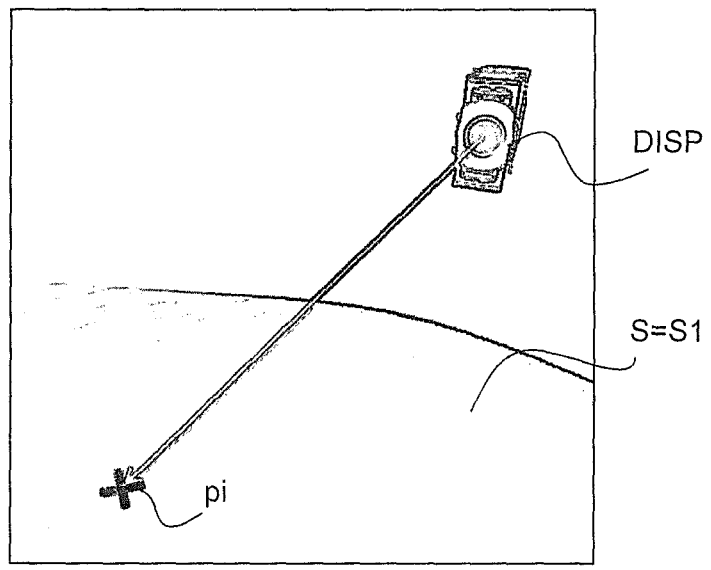
FIG. 6 represents the headlight in FIG. 4 and an impact point of the light beam on the ground.

An impact point pi (at position POSpf1 or POSpf2) is thus obtained on the ground S1 or on the wall S2. FIG. 6 illustrates a non-restrictive example of impact point pi on a projection surface S which is the ground S1.

substep ii)

Once the impact point pi on the ground S1 or on the wall S2 has been determined, the illumination E of this impact point pi is calculated from the previously determined intensity $I(\theta,\delta)$ of the intensity indicator pf.

For the ground S1, the illumination $E_R$ of the impact point pi on the ground is thus obtained with the following formula.

$$E_R = -(I(\theta,\delta)/dist1^2)*\cos\theta*\sin\delta$$

With dist1, the distance between the impact point pi and the light module ML.

For the wall S2, the illumination $E_M$ of the impact point pi on the wall is thus obtained with the following formula.

$$E_M = (I(\theta,\delta)/dist1^2)*\cos\theta*\cos\delta$$

With dist1, the distance between the impact point pi and the light module ML.

Figure 7:
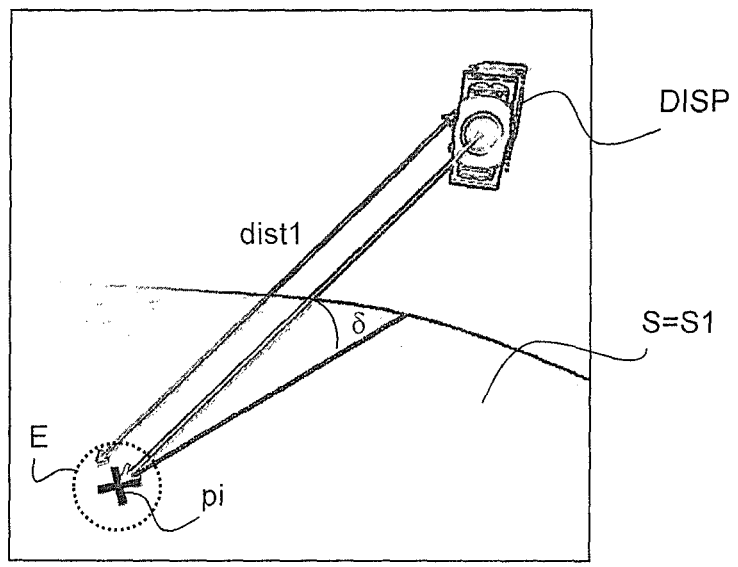
FIG. 7 represents the headlight in FIG. 6 and the illumination of the impact point.

FIG. 7 illustrates the illumination E (delimited by a dotted circle) of an impact point pi on a projection surface S which is the ground S1.

substep iii)

The third calculation is based on:
- the illumination E of said impact points pi;
- a position vector Roeil/Moeil between the position of an impact point of the illumination mapping CECL and the observation position PosO1 of the observer O (in the light module reference frame RP); and
- a light diffusion function d.

d is a known function which makes it possible to calculate the light diffusion by the projection surface S. It will be noted that it varies according to the nature of the projection surface S. For example, the function d is different if the surface is asphalt, concrete, tar, cobblestones, etc.

For the ground S1, the luminance $L_R$ of the impact point pi on the ground is thus obtained with the following formula.

$$L_R = E_R \frac{d\left(arcos\left(\frac{R_{eye}}{\|R_{eye}\|} \cdot z\right)\right)}{\frac{R_{eye}}{\|R_{eye}\|} \cdot z}$$

With $$\frac{R_{eye}}{\|R_{eye}\|} \cdot z$$

the z value of the normed vector Roeil.

For the wall S2, the luminance $L_M$ of the impact point pi on the wall is thus obtained with the following formula.

$$L_M = E_M \frac{d\left(arcos\left(\frac{M_{eye}}{\|M_{eye}\|} \cdot x\right)\right)}{\frac{M_{eye}}{\|M_{eye}\|} \cdot x}$$

With $$\frac{M_{eye}}{\|M_{eye}\|} \cdot x$$

the x value of the normed vector Moeil.

In one non-restrictive embodiment, the assumption is made that the projection surface S emits uniformly in all directions. In this case, the diffusion parameter does not depend on the angles $\delta$ and $\theta$.

In one non-restrictive embodiment, the projection surface S is considered a Lambertian diffuser (e.g. a gray body). There is then a constant luminance on the projection surface S proportional to the illumination E and in this case the diffusion function d is a cosine.

In this case, $L_R = a/\pi E_R$ since $$L_R = E_R \frac{\frac{a}{\pi} \cdot \cos\left(acos\left(\frac{\vec{R}_{eye} \cdot \vec{z}}{\|\vec{R}_{eye}\|}\right)\right)}{\frac{\vec{R}_{eye} \cdot \vec{z}}{\|\vec{R}_{eye}\|}} = \frac{a}{\pi} E_R$$

where a is the albedo of the material,
and $L_M = a/\pi E_M$

In some non-restrictive examples, the albedo of asphalt is 7%, and that of concrete varies between 17% and 27%.

3b) Calculating the positions of the luminance points pl in the image reference frame RI The position PosL1 of a luminance point pl has been previously determined according to the light module reference frame RP. It will be used for the change of coordinate system described below.

In the same way as for calculating the observation position PosO2 of the observer O, this step performs a change of coordinate system. Indeed the light module reference frame RP (defined by the axes pjx, pjy, pjz) changes to the image reference frame RI (defined by the axes lx, ly, lz) of the image to be projected Ip.

Calculating the position PosL2 of a luminance point pl in the image reference frame RI is based on said at least one transformation matrix M for transforming from the light module reference frame RP to said image reference frame RI (transformation matrix M previously described).

In one non-restrictive embodiment, the position PosL2 is of the same form as the position PosO2 previously described:

$$\begin{bmatrix} pjx \\ pjy \\ pjz \\ 1 \end{bmatrix}$$

It will be noted that the transformation matrix M has been described during the calculation of the observation position PosO2 of the observer O in the image reference frame RI. It is therefore not described again here.

Thus PosL2=M*PosL1.

PosL1 is the position of the luminance point pl in the light module reference frame RP.

PosL2 is the position of the luminance point pl in the image reference frame RI.

Figure 9:
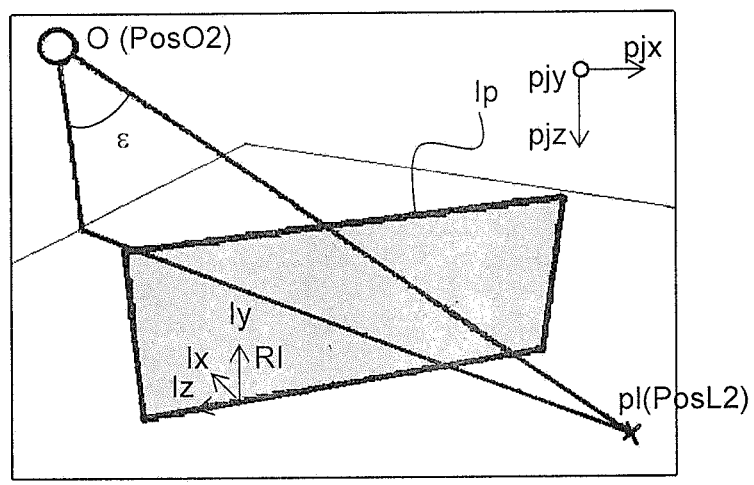
FIG. 9 schematically represents an impact point, an observation position of an observer outside the motor vehicle in an image reference frame and an image to be projected by the projection method in FIG. 1.

FIG. 9 illustrates the image to be projected Ip as well as the image reference frame RI. The luminance point pl and the eye of the observer O (which corresponds to the observation position) can also be seen with their respective position PosL2 and PosO2 defined in the image reference frame RI.

It will be noted that although the projected image Ip on the ground or the wall is in 2D, (two dimensions), a 3D (three dimensional) effect may be obtained, i.e. a perspective or trompe l'oeil effect, by adjusting the elevation angle ε seen previously. The observer O (whether the driver, a passenger, or an outside observer) will see the image in perspective. For this purpose, the elevation angle ε is greater than −90°.

In particular, it is greater than −90° and less than or equal to 0°. The 3D effect is thus visible between 0 and −90° (not inclusive).

It will be noted that at −90° the image IP is flat on the ground and therefore does not have a 3D effect.

Figure 10:
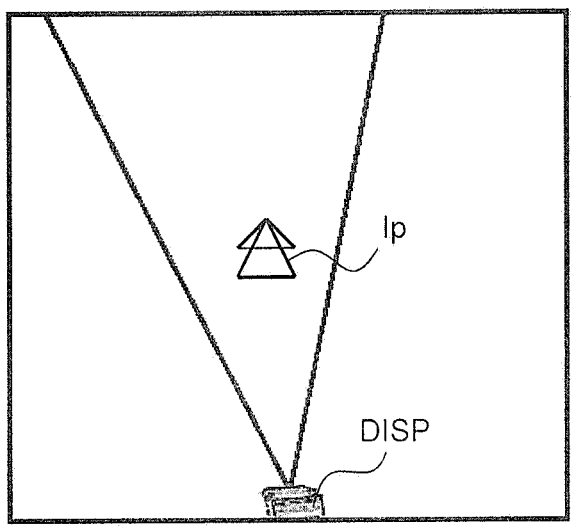
FIG. 10 illustrates an image projected according to the projection method in FIG. 1, an image which is seen from the point of view of the driver of said motor vehicle but which is only comprehensible to an observer outside the motor vehicle.
Figure 11:
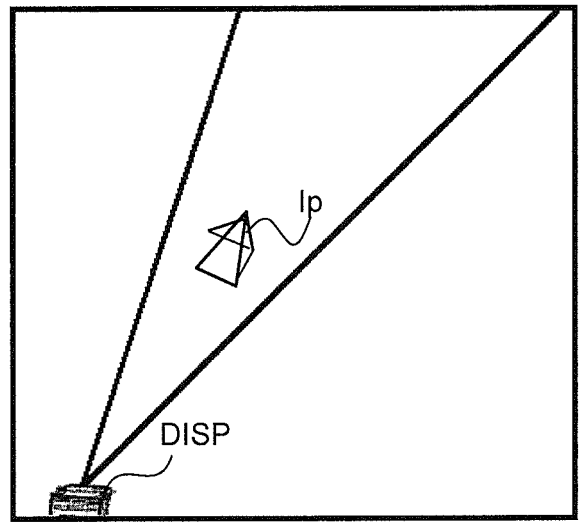
FIG. 11 illustrates an image projected according to the projection method in FIG. 1, an image which is seen from the point of view of a rear passenger of said motor vehicle but which is only comprehensible to an observer outside the motor vehicle.
Figure 12:
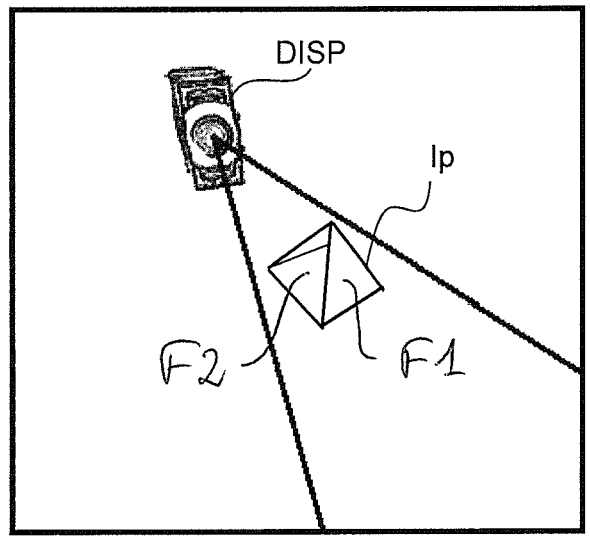
FIG. 12 illustrates an image projected according to the projection method in FIG. 1 which is seen from the point of view of said observer outside the motor vehicle and which is comprehensible to said observer outside the motor vehicle.

FIGS. 10 through 12 illustrate a projected image Ip which is a pyramid. An observer O who is outside the motor vehicle, such as a pedestrian, is taken as a non-restrictive example. The pyramid is visible from three particular points of view, the point of view of the driver (FIG. 10), the point of view of a rear passenger (FIG. 11) and the point of view of the pedestrian (FIG. 12), but is only seen in 3D from a single point of view. In the non-restrictive example illustrated, only the pedestrian will see the pyramid in 3D (as illustrated in FIG. 12). From the point of view of the driver or of the passenger, the pyramid appears distorted.

In one non-restrictive variant embodiment, the elevation angle ε is equal to 0. The observer O is looking straight ahead. In this case, the observer O will see the image, namely here the pyramid, as if it were standing upright.

In one non-restrictive variant embodiment, the elevation angle ε is equal to −35°. This makes it possible to have a raised 3D effect in the direction of the highway.

The plane P1 of the image Ip is thus perpendicular to the direction of observation of the observer O.

If the elevation angle ε is different from −90°, the pyramid will thus be visible in 3D but more or less tilted.

Figure 13:
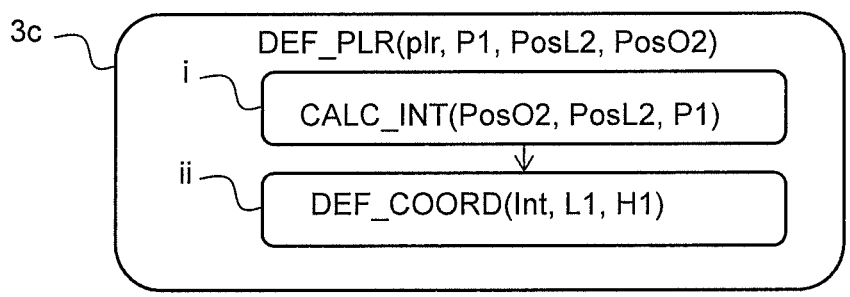
FIG. 13 represents a flow diagram illustrating substeps of a step of defining coordinates of a projection of a luminance point in the projection method in FIG. 1 according to a non-restrictive embodiment.

3c) defining the coordinates ply, plz of the projection plr of a luminance point pl As illustrated in FIG. 13, in one non-restrictive embodiment, defining the coordinates ply, plz of a projection plr of a luminance point pl includes the substeps of:

i) calculating the intersection point Int between (illustrated substep CALC_INT(PosO2, PosL2, P1)):
   the straight line V(PosO2, PosL2) passing through the observation position PosO2 in said image reference frame RI of the observer O and through the position PosL2 in said image reference frame RI of said luminance point pl; and
   the image plane P1 of the image to be projected Ip.

ii) determining the coordinates ply, plz of said intersection point Int from the dimensions L1, H1 of said image to be projected Ip (illustrated substep DEF_COORD(Int, L1, H1).

These two substeps are described below.

substep i)

In the image reference frame RI, the intersection point Int between the straight line (eye, luminance point) and the image plane P1 is the point of the straight line (eye, luminance point) for which lx=0. Thus:

$$\mathrm{Int} = \mathrm{Pos}O2 - ((\mathrm{Pos}O2.x)/(V(\mathrm{Pos}O2,\mathrm{Pos}L2).x))^* V(\mathrm{Pos}O2,\mathrm{Pos}L2)$$

With

V(PosO2, posL2) the vector representing the straight line (eye, luminance point) in the image reference frame RI;
V(PosO2, posL2).x the x value of the vector;
Int the intersection point between the straight line (eye, pl) and the image to be projected Ip in the image reference frame RI. The intersection point Int is thus the projection plr of the luminance point pl on the image plane P1 of the image to be projected Ip;

PosL2.x the x value of the position of the luminance point pl;
PosO2.x the x value of the observation position of the observer.

It will be noted that the assumption is made that the observation position of the observer O is placed on the lx axis.

Figure 14:
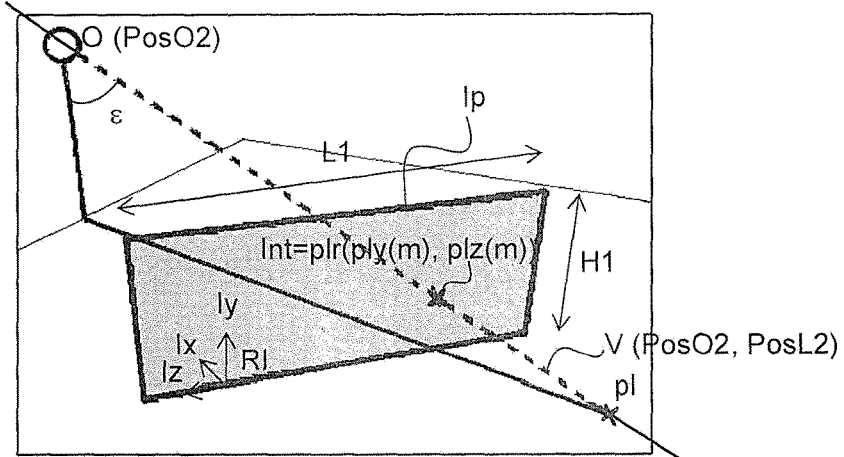
FIG. 14 schematically represents the impact point, the observation position of the observer outside the motor vehicle and the image to be projected in FIG. 9 by the projection method in FIG. 1 and the coordinates of the intersection between the impact point and the image to be projected.

FIG. 14 illustrates the image to be projected Ip, the intersection point Int that corresponds to the projection plr of the luminance point pl on said plane P1 and the vector V(posO2, posL2) (illustrated in a dotted line). It will be noted that the projection plr is of the central type, so as to produce a conical perspective effect. Hereafter the term projection plr or central projection plr will be used interchangeably.

substep ii)

The coordinates ply, plz of the central projection plr of the luminance point pl in the image reference frame RI correspond to the coordinates along the ly (vertical) axis and along the lz (horizontal) axis of the position of the intersection point Int previously determined. In one non-restrictive embodiment, they are expressed in meters.

The coordinates of this point in the coordinate system of FIG. 14 are deduced by the following formulae:

$$\mathrm{ply} = (\mathrm{Int}.y + (L1/2))/L1$$

$$\mathrm{plz} = \mathrm{Int}.z/H1$$

With,

L1 the width of the image to be projected Ip (expressed in meters in one non-restrictive example);
H1 the height of the image to be projected Ip (expressed in meters in one non-restrictive example);
Int.y the y value of the intersection point;
Int.z the z value of the intersection point.

FIG. 14 illustrates the definition of the coordinates ply and plz in meters in the image reference frame RI.

It will be noted that L1 and H1 are input parameters of the projection method MTH.

This substep makes it possible to determine thereafter whether the coordinates ply, plz belong to the image to be projected Ip (they must then be between 0 and 1) and therefore whether the central projection plr of the luminance point pl belongs to the image to be projected Ip.

For this purpose, in one non-restrictive embodiment, the image to be projected Ip and the coordinates of the projection plr thus calculated are normalized. This makes it possible to simplify the test for belonging to the image to be projected Ip.

Figure 15:
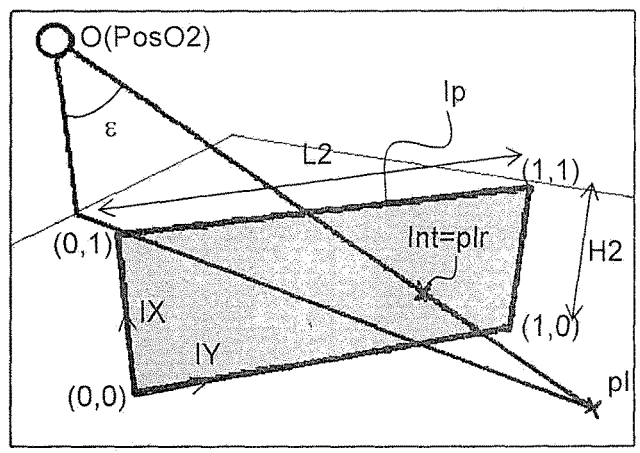
FIG. 15 schematically represents the impact point, the observation position of the observer outside the motor vehicle and the normalized image to be projected in FIG. 14.

Thus a normed coordinate system IX (vertical axis), IY (horizontal axis) is obtained as illustrated in FIG. 15. The value of the coordinates ply, plz of the projection plr is now between 0 and 1. In the illustrated example, the axes ly and lz, which have become respectively the IX and axes −IY axes. Thus image dimensions H2, L2 are obtained between 0 and 1.

FIG. 15 illustrates the definition of the coordinates ply and plz in unitless values in the image reference frame RI.

It will be noted that the size (L1, H1) of the image to be projected Ip may be defined in this step 3c) or in the step with the transformation matrix M.

Given that the dimensions L1 and H1 and therefore L2, H2, the position and the rotation of the image to be projected Ip are known (these are input parameters of the projection method MTH), it may easily be determined, via the coordinates ply, plz thereof, whether or not the projection pl belongs the image to be projected Ip.

3d) Defining the coordinates of the corresponding pixel Pix

The row (lig) and column (col) coordinates of the pixel Pix are defined for each projection plr (of luminance point pl) that belongs to the image to be projected Ip, namely which is located inside the rectangle L2*H2 of the image to be projected Ip, which was verified in step 3c-ii).

Thus, if the projection plr belongs to the image to be projected Ip, the coordinates of the corresponding pixel Pix are calculated. They are calculated as follows.

$$Lig=-plz*L2$$

$$Col=ply*H2$$

With,
lig, the row of the pixel;
col, the column of the pixel;
L2 the width of the image to be projected Ip (this time expressed in pixels);
H2 the height of the image to be projected Ip (this time expressed in pixels);
ply the coordinate of the projection plr along the IX axis;
plz the coordinate of the projection plr along the IY axis.

3e) Correcting the intensity value of the corresponding intensity indicator pf

With the lig, col coordinates of the pixel Pix, the value of its color Co can be recovered in the image to be projected.

Figure 16:
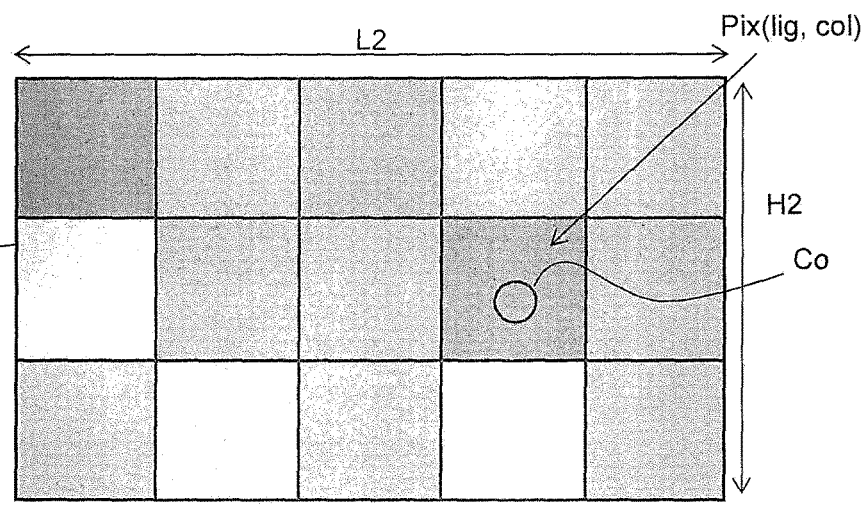
FIG. 16 schematically represents pixels of the image to be projected in FIG. 14.

In one non-restrictive example, the value is between 0 and 255. It may thus range from white to black passing through multiple shades of gray as illustrated in FIG. 16. The term white must be understood to mean any single color and the expression shades of gray must be understood to mean the shades obtained of said single color between its clearest shade and black. Thus the projected image is not necessarily composed of the color white and shades of gray associated with the values of Co between 0 and 255, but more or less dark shades of any color visible to the human eye. Advantageously it is white, yellow, blue, red or amber.

Then the intensity value Vi of the corresponding intensity indicator pf is corrected.

It will be noted that this is possible since the light module ML is digitized.

In a first non-restrictive embodiment, the correction is performed as follows:

$$Vi=\sigma.Vi0*Co/255.$$

With:
Vi0 the initial intensity value of the intensity indicator pf of the light module,
Co the color of the corresponding pixel Pix; and
σ a maximum overdrive factor.

In a second non-restrictive embodiment, the correction is performed as follows:
Vi=φ.Co, with φ a luminance coefficient. Thus a luminance substitution is performed. This makes it possible to display the image on a background independent of the base light distribution.

This step is performed for all the luminance points pl, the central projection plr of which belongs to the rectangle L2*H2 of the image to be projected Ip.

Thus, the light module ML can project onto the projection surface S the light beam Fx including the light rays Rx with the corrected intensity values Vi of the intensity indicators (step 3f) illustrated in FIG. 1 PROJ(ML, Fx, pf, Vi). This makes it possible to display the correct color Co for the intensity indicator considered. In this way, the image to be projected Ip is integrated into the light beam Fx of the light module ML (since it is produced by said light module ML itself) and is projected onto the projection surface S with the correct colors.

Thus, according to the desired color Co of a pixel Pix, a determined correction factor is applied to the intensity value Vi of the corresponding intensity indicator pf. Thus, intensity indicators may be obtained, the color of which does not depend on the light intensity of the light beam Fx itself. For example, the projected pyramid illustrated is of homogeneous color. In the case of a light source independent of the light module ML which would project said pyramid superimposed on said light beam, this would not be the case. The pixels of the image would be more or less illuminated according to the distribution of the light intensity of said light beam. Their color would thus vary according to the light intensity of said light beam.

Furthermore, the fact that the image to be projected Ip is integrated into said light beam Fx and not superimposed makes it possible to obtain a better contrast of the image on the projection surface S than in the case of using an independent light source. In the case of an independent light source, the light beam also illuminates the projected image. The latter is therefore clearer at the level of the colors.

It should be noted that the color value Co of a pixel, or of a series of pixels corresponding to predetermined parts of the projected image, may also be used to reinforce the 3D effect. For example, referring to FIG. 12, the pixels corresponding to the face F1 of the pattern of the projected image and those corresponding to the face F2 of the pattern of the projected image, may comprise specific and different color values Co. Thus the face F1 seems brighter than the face F2 or vice versa according to whether the value of the color Co corresponding to the component pixels of the face F1 is higher or lower than that corresponding to the component pixels of the face F2. The value of the color Co corresponding to the component pixels of the face F1 and/or F2 may also vary so as to create a shaded effect, e.g. from one side to the other of the face F1 and/or F2, making it possible to reinforce the 3D effect even more.

It is possible to obtain multicolored images by using multiple systems operating according to the method described above and each emitting a visually different color. The images projected by each system are then calculated for being projected onto the projection surface S in a superimposed manner in order to obtain an overall multicolored projected image.

It will be noted that as the projection of the image to be projected Ip depends on the observation position of the observer O, it is therefore continually updated according to the movement of the observer O with respect to the motor vehicle when the observer is outside the motor vehicle and according to the movement of the motor vehicle itself when the observer O is inside the motor vehicle. In one non-restrictive embodiment, the refresh rate of the calculations described above is thus a function of the speed of movement of the observer with respect to the motor vehicle for the case of an outside observer. The more the speed increases, the more the refresh rate increases. The more the speed decreases, the more the refresh rate decreases.

In another non-restrictive embodiment, the refresh rate of the calculations described above is constant. In one non-restrictive example, the rate is one second.

Thus, since these calculations are performed in real time, it is not necessary to have a database with images of the same graphic symbol preloaded in memory corresponding to multiple imaginable observation positions of the observer with respect to the motor vehicle (when they are outside), or in the motor vehicle (when they are inside).

The projection method MTH thus makes it possible to project one or more images Ip onto a projection surface S which is not only visible to an observer located inside or outside the motor vehicle but also comprehensible to them since the projected image Ip is oriented in the direction of gaze of said observer O.

It will be noted that in the case where multiple images Ip are projected at the same time, the combination of the different images with the light beam Fx is calculated before projecting the overall result.

In one non-restrictive embodiment, the projection method MTH is implemented by a lighting device DISP for a motor vehicle V.

In one non-restrictive embodiment, the lighting device DISP makes it possible to implement a regulation photometric function such as a low beam, high beam or a front, rear and/or side signaling function. Thus, the lighting device is located at the front of the motor vehicle or at the rear.

Figure 17:
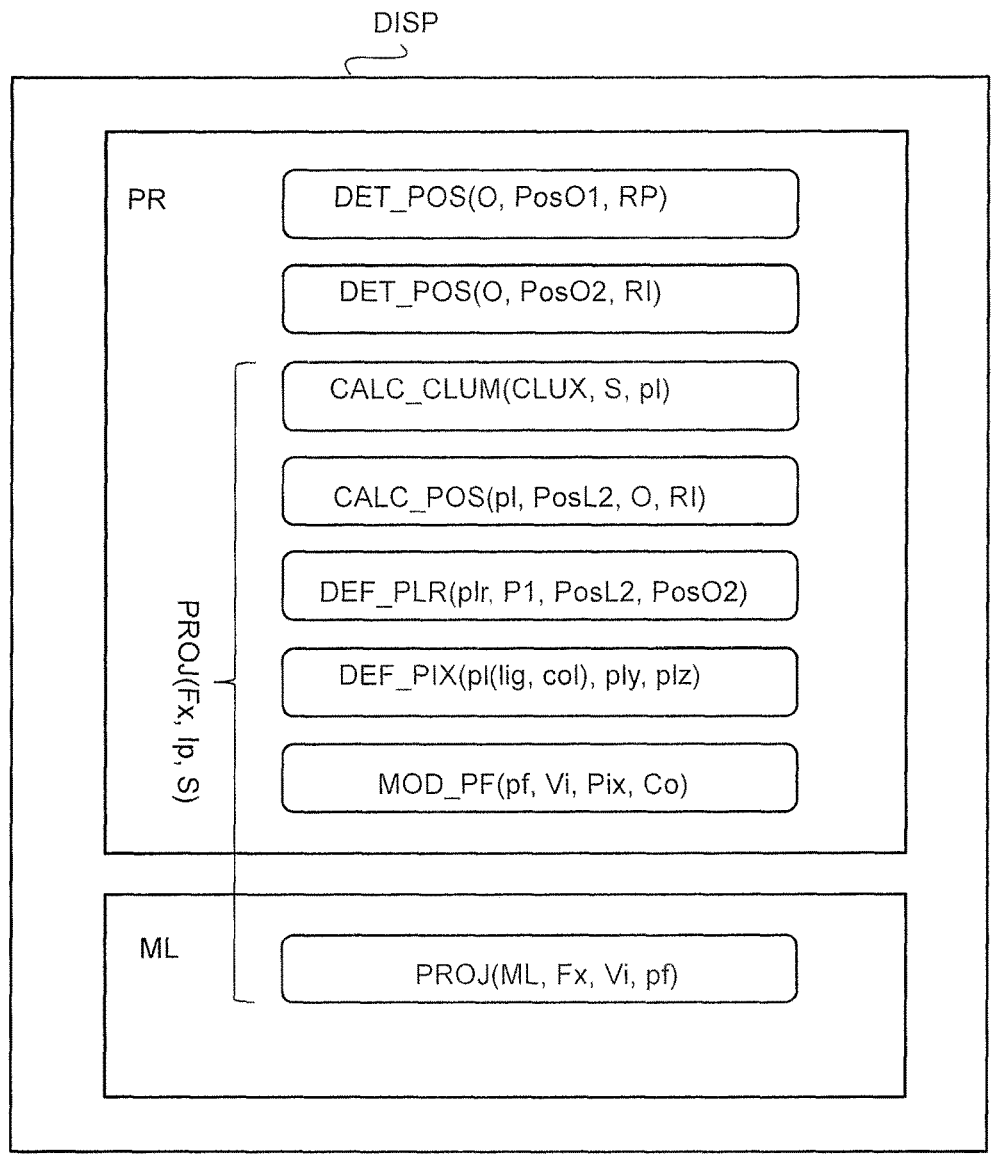
FIG. 17 illustrates a lighting device suitable for implementing the projection method in FIG. 1.

The lighting device DISP is illustrated in FIG. 17. It includes a processing unit PR and at least one light module ML. In some non-restrictive embodiments, the lighting device is a headlight or a rear light.

The processing unit PR is suitable for:
  detecting an observation position PosO1 of an observer O in a light module reference frame RP (illustrated function DET_POS(O, PosO1, RP));
  calculating the observation position PosO2 of the eye of the observer O in an image reference frame RI (illustrated function DET_POS(O, PosO2, RI));

Said lighting device DISP is suitable for projecting said image Ip onto said projection surface S according to said observation position PosO2 of the observer O in the image reference frame RI, said image Ip being integrated into said light beam Fx of the light module ML (illustrated function PROJ(Fx, Ip, S)).

For projecting said image Ip onto said projection surface S, the processing unit PR is further suitable for:
  from a light intensity map CLUX of the light module ML including a plurality of intensity indicators pf, calculating a luminance mapping CLUM on the projection surface S resulting in luminance points pl (illustrated function CALC_CLUM(CLUX, S, pl));
  calculating the position PosL2 of each luminance point pl in the image reference frame RI (illustrated function CALC_POS(pl, PosL2, O, RI));
  from its position PosL2 and the observation position PosO2 of the observer O in said image reference frame RI, defining the coordinates ply, plz of the projection plr of each luminance point pl on the image plane P1 of said image to be projected Ip (illustrated function DEF_PLR(plr, P1, PosL2, PosO2));
  if said projection plr belongs to said image to be projected Ip, defining coordinates lig, col of the corresponding pixel Pix (illustrated function DEF_PIX (pl(lig, col), ply, plz));
  for each projection plr of a luminance point pl belonging to said image to be projected Ip, correcting the intensity value Vi of the corresponding intensity indicator pf according to the color Co of the corresponding pixel Pix (illustrated function MOD_PF(pf, Vi, Pix, Co));

For projecting said image Ip onto the projection surface S, the light module ML is suitable for projecting onto the projection surface S the light beam Fx with the corrected intensity values VI of the intensity indicators pf (illustrated function PROJ(ML, Fx, Vi, pf)).

It will be noted that the processing unit PR is integrated into the light module ML or is independent of said light module ML.

Of course the description of the invention is not limited to the embodiments described above.

Thus, in another non-restrictive embodiment, a type B goniophotometer may also be used, i.e. one where the rotational movement about the vertical axis supports the rotational movement about the horizontal axis.

Thus, in another non-restrictive embodiment, the processing unit PR can be offset with respect to the lighting device DISP.

Thus, the step of calculating the observation position PosO2 in the image reference frame RI may be performed before or at the same time as calculating the luminance position PosL2.

Thus, the motor vehicle V includes one or more lighting devices DISP suitable for implementing the projection method MTH described.

Thus, the invention described has the following advantages:
  it makes it possible to project an image including at least one graphic symbol which makes it possible to improve the comfort and/or safety of an observer who is inside or outside the motor vehicle;
  it makes it possible to project an image that is visible and comprehensible to a given observer since said projection depends on the position of said observer; the same projection method is thus applied for projecting an image comprehensible to the driver or for projecting an image comprehensible to the pedestrian or even to a driver of a following vehicle, for example; it makes it possible to distort the image to be projected Ip so that it is comprehensible to a given observer. Thus an anamorphosis of an image is created, said anamorphosis being dependent on the observation position of the observer O;
  the observation position of the observer in the image reference frame is a function of the position and the rotation of said image to be projected. Thanks to the rotation which depends notably on an elevation angle, when the latter is set in a particular way, the observer has the impression of seeing an image in 3D;
  it makes it possible to integrate the information to be projected into the lighting beam Fx of the light module ML of the motor vehicle. It is not necessary to have an additional dedicated light source;
  thus, unlike a prior art technique which displays an image directly on the glass of the rear light of the motor vehicle and which may appear too small at a certain distance, the invention enables an outside observer who is located at a certain distance from said motor vehicle to see the image correctly since the image is projected according to the actual position of the observer and onto a projection surface that is not the glass of a light of the motor vehicle. The dimensions of the image to be projected Ip are no longer limited to the small projection surface such as the glass of the light;
  it makes it possible to provide a solution that may be used for a recipient of the information who can only see the front or sides of the motor vehicle, for example, unlike a solution that displays an image on the rear lights of the motor vehicle;
  it makes it possible to provide a solution other than a display of image(s) on the rear lights of the motor vehicle;

it makes it possible to provide a solution other than a projection of image(s) solely dedicated to the driver of the motor vehicle.

The invention claimed is:

1. A projection method for a motor vehicle, for projecting at least one image onto a projection surface by means of a light module suitable for projecting a light beam, wherein said projection method includes the steps of:
   detecting an observation position of an observer in a light module reference frame;
   calculating the observation position of the observer in an image reference frame;
   projecting said image onto said projection surface according to said observation position of the observer in said image reference frame, said image being integrated into said light beam of the light module.

2. The projection method as claimed in claim 1, wherein the projection of said image comprises the substeps of:
   from a light intensity map of the light beam of the light module including a plurality of intensity indicators, calculating a luminance mapping on the projection surface resulting in luminance points;
   calculating the position of each luminance point in the image reference frame;
   from the position of each luminance point and the observation position of the observer in said image reference frame, defining coordinates of projection of each luminance point on an image plane of said image to be projected;
   if said projection belongs to said image to be projected, defining coordinates of corresponding pixel;
   for each projection of a luminance point belonging to said image to be projected, correcting an intensity value of the corresponding intensity indicator according to the color of the corresponding pixel.

3. The projection method as claimed in claim 2, wherein calculating the luminance mapping on the projection surface includes the steps of:
   performing a first calculation of the position of said intensity indicators on the projection surface resulting in impact points;
   performing a second calculation of an illumination mapping of said impact points;
   performing a third calculation of the luminance mapping of said impact points from the illumination mapping resulting in said luminance points.

4. The projection method as claimed in claim 3, wherein said first calculation is based on:
   the position of the light module; and
   the direction of said intensity indicators.

5. The projection method as claimed in claim 3, wherein said second calculation is based on:
   the calculated position of the intensity indicators;
   the light intensity of said intensity indicators; and
   the distance between the light module and said impact points.

6. The projection method as claimed in claim 1, wherein the image to be projected is calculated according to properties of the projection surface.

7. The projection method as claimed in claim 3, wherein said third calculation is based on:
   illumination of said impact points;
   a position vector between the position of an impact point of the illumination mapping and the observation position of the observer; and
   a light diffusion function.

8. The projection method as claimed in claim 2, wherein calculating the observation position of an observer and the position of a luminance point in the image reference frame is based on at least one transformation matrix for transforming from the light module reference frame to said image reference frame which takes into account one of the following parameters:
   position of the image to be projected in the light module reference frame;
   rotation of the image to be projected.

9. The projection method as claimed in claim 2, wherein defining the coordinates of a projection of a luminance point includes the substeps of:
   calculating the intersection point between:
      the straight line passing through the observation position in said image reference frame of the observer and through the position in said image reference frame of said luminance point; and
      the image plane of the image to be projected;
   determining the coordinates of said intersection point from dimensions of said image to be projected.

10. The projection method as claimed in claim 1, wherein the projection surface is considered as a Lambertian diffuser.

11. The projection method as claimed in claim 1, wherein the projection surface is a ground or a wall.

12. The projection method as claimed in claim 1, wherein the observer is outside the motor vehicle or is located in said motor vehicle.

13. The projection method as claimed in claim 1, wherein the image appears distorted in the light module reference frame and not distorted in the reference frame.

14. The projection method as claimed in claim 1, wherein calculating the observation position of the observer in the image reference frame is a function of the position and the rotation of the image to be projected in the light module reference frame, said rotation being a function of an elevation angle greater than −90° and less than or equal to 0°.

15. The projection method as claimed in claim 2, wherein calculating the observation position of each luminance point in the image reference frame is a function of the position and the rotation of the image to be projected in the light module reference frame, said rotation being a function of an elevation angle greater than −90° and less than or equal to 0°.

16. The projection method as claimed in claim 14, wherein the elevation angle is equal to 0.

17. The projection method as claimed in claim 14, wherein the elevation angle is substantially equal to minus 35°.

18. The projection method as claimed in claim 1, wherein the projection of said image to be projected is of the central type.

19. The projection method as claimed in claim 2, wherein correcting the intensity value (Vi) of the intensity indicator (pf) is performed as follows:
   $Vi = \sigma \cdot Vi0 * Co/255$, with Vi the corrected intensity value, Vi0 the initial intensity value of the intensity indicator (pf) of the light module, Co the color of the corresponding pixel, σ a maximum overdrive factor.

20. The projection method as claimed in claim 2, wherein correcting the intensity value of the intensity indicator is performed as follows:
   $Vi = \varphi \cdot Co$, with Vi the corrected intensity value, φ a luminance coefficient, Co the color of the corresponding pixel.

21. The projection method as claimed in claim 1, wherein the observation position of an observer is calculated by means of a camera.

22. The projection method as claimed in claim 2, wherein the light intensity map is stored in memory.

23. The projection method as claimed in claim 2, wherein the projection of said image onto the projection surface further comprises the substep of projecting by means of said light module onto the projection surface the light beam with the corrected intensity values of the intensity indicators.

24. A lighting device for a motor vehicle including a processing unit and a light module suitable for projecting a light beam, wherein:
   said processing unit is suitable for:
   detecting an observation position of an observer in a light module reference frame;
   calculating the observation position of the observer in an image reference frame;
   said lighting device is suitable for projecting an image onto a projection surface according to said observation position of the observer in the image reference frame, said image being integrated into said light beam of the light module.

25. The lighting device as claimed in claim 24, wherein the device projects said image onto the projection surface, said processing unit is further suitable for:
   from a light intensity map of the light beam of the light module including a plurality of intensity indicators, calculating a luminance mapping on the projection surface resulting in luminance points;
   calculating the position of each luminance point in the image reference frame;
   from the position of each luminance point and the observation position of the observer in said image reference frame, defining coordinates of the projection of each luminance point on an image plane of said image to be projected;
   if said projection belongs to said image to be projected, defining coordinates of corresponding pixel;
   for each projection of a luminance point belonging to said image to be projected, correcting an intensity value of the corresponding intensity indicator according to the color of the corresponding pixel.

26. The lighting device as claimed in claim 25, wherein the device projects said image onto the projection surface the light module is suitable for projecting onto the projection surface the light beam with the corrected intensity values of the intensity indicators.

27. The lighting device as claimed in claim 24, wherein the lighting device is a headlight or a rear light.

28. A motor vehicle including a lighting device as claimed in claim 24.

* * * * *